INVENTOR
JAMES C. AHLSTEN
BY
ATTORNEY

Jan. 27, 1970   J. C. AHLSTEN   3,491,728
ROTARY FAN INTERNAL COMBUSTION ENGINE
Filed March 10, 1967   3 Sheets-Sheet 3

INVENTOR
JAMES C. AHLSTEN
BY
ATTORNEY

United States Patent Office 3,491,728
Patented Jan. 27, 1970

3,491,728
ROTARY FAN INTERNAL COMBUSTION ENGINE
James C. Ahlsten, 412A Buccaneer Drive,
Corpus Christi, Tex. 78411
Filed Mar. 10, 1967, Ser. No. 622,182
Int. Cl. F02b 55/08; F01c 1/04
U.S. Cl. 123—8                             2 Claims

ABSTRACT OF THE DISCLOSURE

A rotary engine constructed in a cylindrical engine housing comprising a multiplicity of fan-like pistons rotatably mounted on piston shafts engaging a central shaft, gear means interconnecting the central shaft and the piston shafts rotating the pistons 180° as the central shaft rotates 360°, a toroidal cylinder including a venturi section, and an oppositely positioned and exhaust intake section, piston gear means rotate the pistons in the toroidal cylinder passing the pistons minimum diameter through the venturi section and the maximum diameter through the intake exhaust section, control fuel injection means and ignition means are positioned in the venturi section.

---

A rotary engine wherein elliptical fan like pistons mounted on a spherical housing and shaft rotate in an outer engine housing. The pistons move through a toroidal cylinder generally having a venturi shape. Gear means rotate the fan like pistons 180° as the shaft rotates 360° so coordinated as to pass the narrow dimension of the piston through the throat of the venturi where fuel injection and combustion occurs. Air is compressed by movement through the throat of the venturi in coordination with the centrifugal blower effect. Combustion applies pressure to the greater piston area, thereby causing fan rotation.

Rotary engines of the prior art accomplish compression movement of pistons or veins in a substantially toroidal cylinder at varying rates of rotation exhausting or compressing and firing the fuel as the pistons or veins move together. Some rotary engines of the prior art use a start and stop reciprocating motion for the pistons or veins. Other devices utilize linkage or elliptical gears to vary the rate of rotation of the pistons or veins. Many of the advantages of a rotary engine are lost in the stop and start or reciprocating action incorporated in their concepts. In engines such as the Wankel, a primary technical problem has been the seal at the points of the triangular like piston.

One object of this invention is to create a rotary engine with pistons consistently spaced with no reciprocating action.

Another object is to conceive an engine of a design or configuration which eliminates the requirement for gas retaining seals between the piston and the cylinder wall.

The preferred embodiment of the invention herein disclosed comprises a twelve (12) bladed fan like structure mounted on a shaft by means of a substantially spherical case. Appropriate bearing means between the moving parts and between the rotary sphere and housing are provided to reduce friction and retain components in place. Gear means coordinate the rotation of the spherical case and the fan shaped blades which rotate in a toroidal cylinder or combustion chamber. The elongated dimension of the fan shaped blades is generally parallel to the drive shaft at the exhaust intake area. As the blades rotate to the firing position, they approach an angle where the elongated dimension is at right angles to the shaft. The dimensions of the toroidal cylinder narrow to a venturi like throat at the point of maximum compression were fuel is injected and ignition occurs. The force of combustion is exerted against the surface of the blade like pistons and the walls of the cylinder. The position of the pistons as they rotate is such that the greater surface exposed to combustion after dead center is always in the direction of rotation thereby imparting driving force to the drive shaft. The device of this invention combines the constant relation of parts and freedom from reciprocating action of a gas turbine while incorporating the torque flexibility over a relatively wide range of r.p.m. of the conventional reciprocating internal combustion engine. The elimination of reciprocating components permits operation at high r.p.m.'s approaching those of gas turbines. The power to weight ratio therefore is exceptionally high.

Other advantages of this invention and objects accomplished will become apparent to one skilled in the art of heat engines as a study is made of this disclosure and the appended claims.

FIG. 4 can be interposed over FIG. 3 to illustrate the sequential position of the pistons in rotating through a complete 360° cycle on the central shaft.

Referring now to the figures wherein like reference characters refer to identical or corresponding components throughout the various views.

Figure 1:
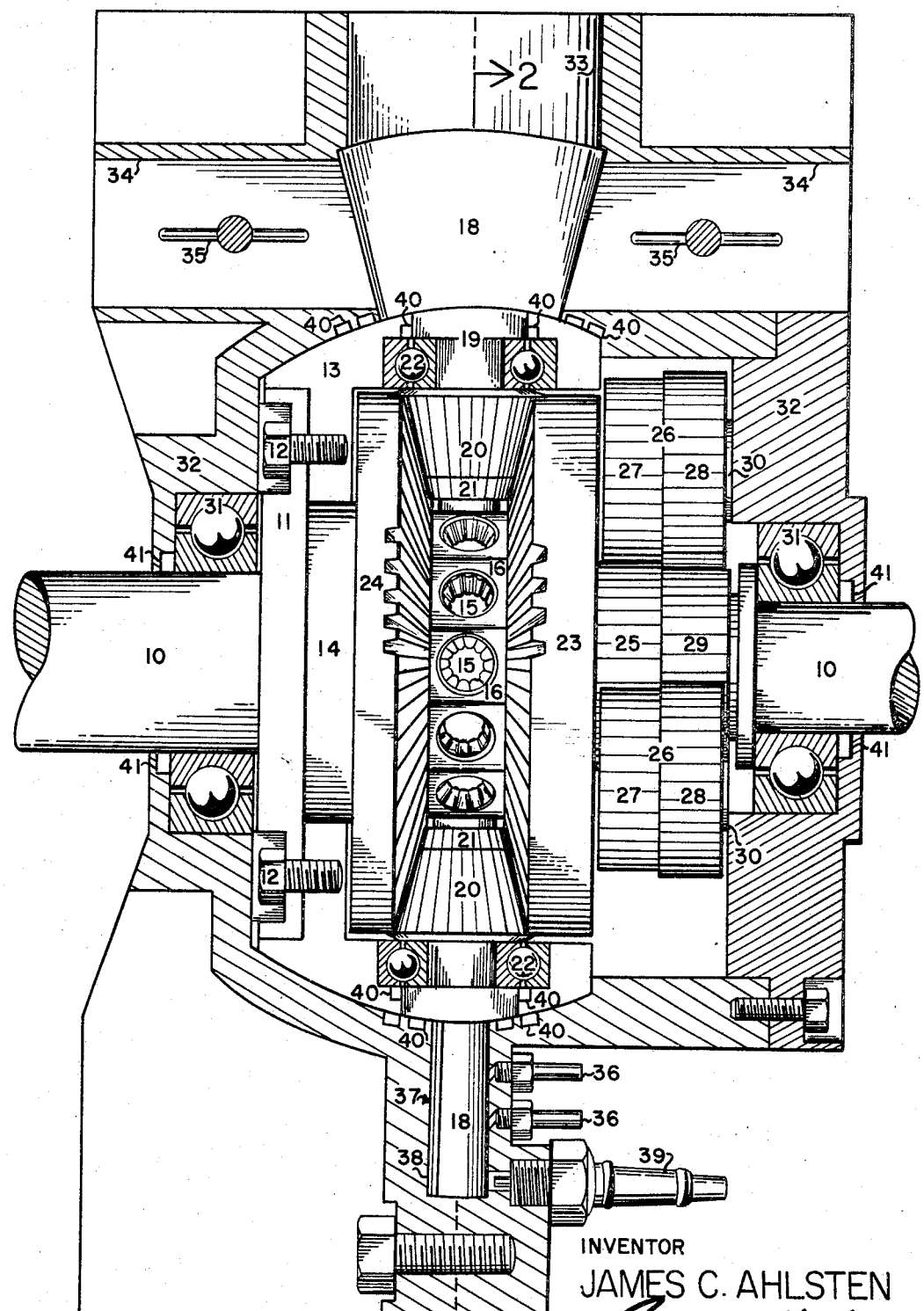
FIG. 1 is a side elevation partially in section with the shaft and a portion of the gearing illustrated in perspective.
Figure 2:
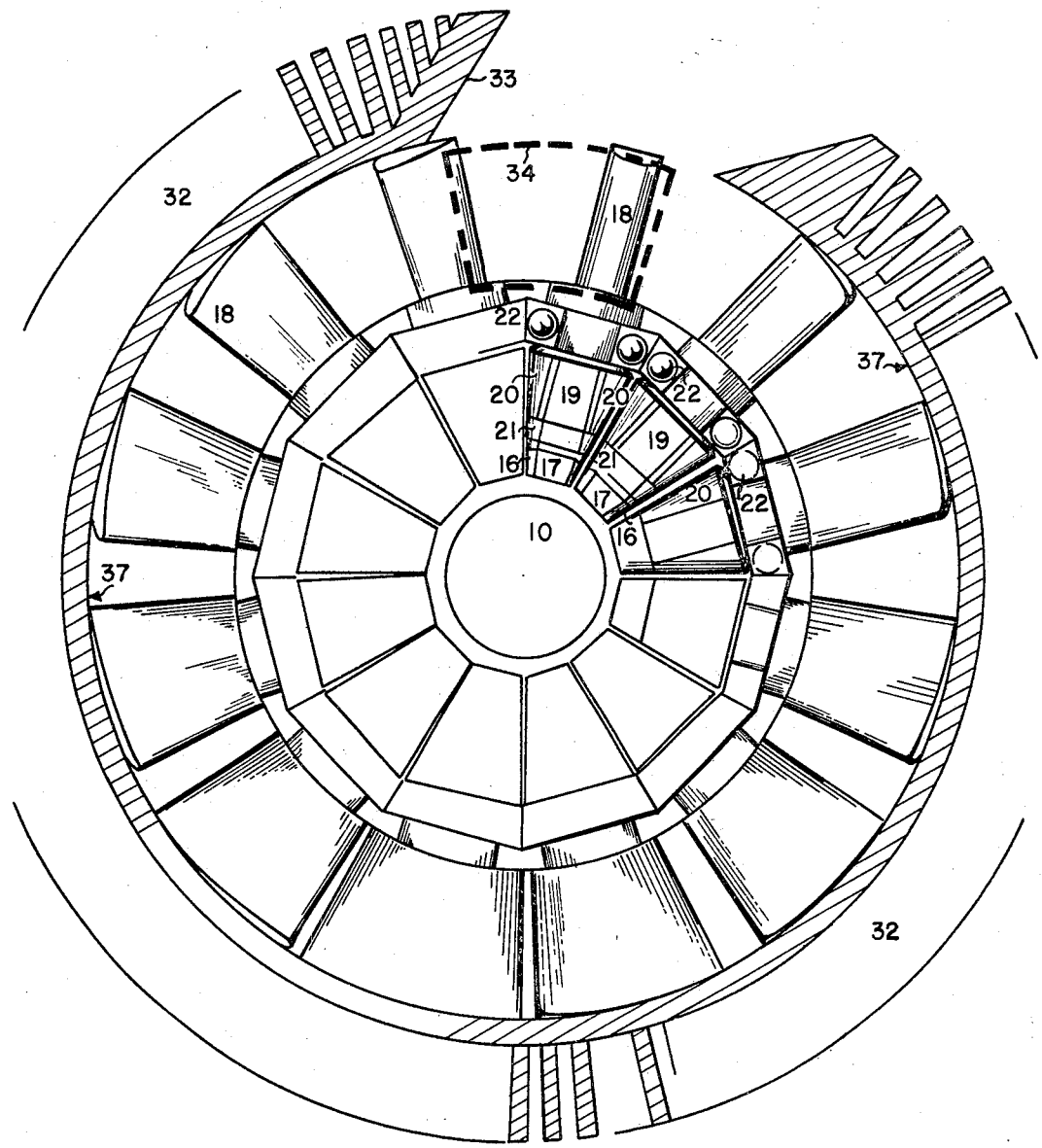
FIG. 2 is a front elevation in section in FIG. 1 on line 2—2 looking in the direction of the arrows.

The concept of this engine and its mode of construction lends extreme flexibility to the various embodiments. Virtually any number of blades or pistons may be used in the construction. The minimum is considered to be approximately six (6). The preferred embodiment illustrated and described utilizes twelve (12) blades or pistons. Referring now to FIG. 1, the device is constructed around a central shaft 10 with a flange 11 which is secured by bolts 12 to the spherical housing 13. The shaft 10 includes a hub 14 into which is formed a series of recesses 15. Referring now to FIGS. 1 and 2, these recesses are fitted with roller bearings 16 which are designed to receive the stud 17 of a blade 18 shaft 19. A conical spur gear 20 is securely keyed to the shaft 19 of a blade 18 and retained in position by a spur gear lock nut 21. The blades 18 are retained in the spherical housing 13 principally by the combination of the thrust bearing 22 and the conical gear 20.

The angle of rotation of the blade 18 is primarily controlled by the master gear 23 and slave gear 24; these gears are rotatably mounted around the hub 14 of the central shaft 10 and may be further supported and rotatably secured in position by a series of roller or ball bearings (not shown). The master gear 23 and the conical spur gear 20 have a ratio of four (4) to one (1). The master gear 23 is constructed with a smaller base gear 25 component which in the embodiment illustrated has twenty-four (24) teeth which are meshed with a twenty-one (21) tooth base section 27 of the three (3) synchronizing gears 26. The actual tooth count on the two (2) gears is immaterial so long as the ratio of eight (8) for the base gear 25 to seven (7) for the synchronizing gear 26 is maintained. The synchronizing gear 26 is an intergral construction with a base section 27 and a shaft section 28. The shaft section 28 of the synchronizing gear 26 is meshed in a one (1) to one (1) ratio with the shaft gear 29 which is constructed intergal with or keyed on the central shaft 10. The synchronizing gears are rotatably mounted on a synchronizing shaft 30 partially shown in FIG. 1. The entire rotating assembly is mounted in the two main bearings 31 which are secured to the engine housing 32, FIGS. 1 and 2. The housing illustrated suggests a finned air cooled construction, however, the engine might well incorporate a liquid retaining jacket for liquid cooling.

The exhaust and air induction system is perhaps best illustrated by FIG. 2 in conjunction with FIG. 1. As the blades 18 rotate following combustion, which occurs at the bottom of FIGS. 1 and 2, a blade 18 will uncover the exhaust port 33 a few degrees prior to uncovering an intake port 34. Due to centrifugal force, the exhaust gasses will be thrust from the system at a tangent to the arc of rotation of the blades 18. The momentum of the exhaust gasses will create a partial vacuum in the volume evacuated which will be filled by air through the intake ports 34. For partial throttle operation, the intake of air can be limited or controlled by the butterfly valves 35.

Figures 3, 4:
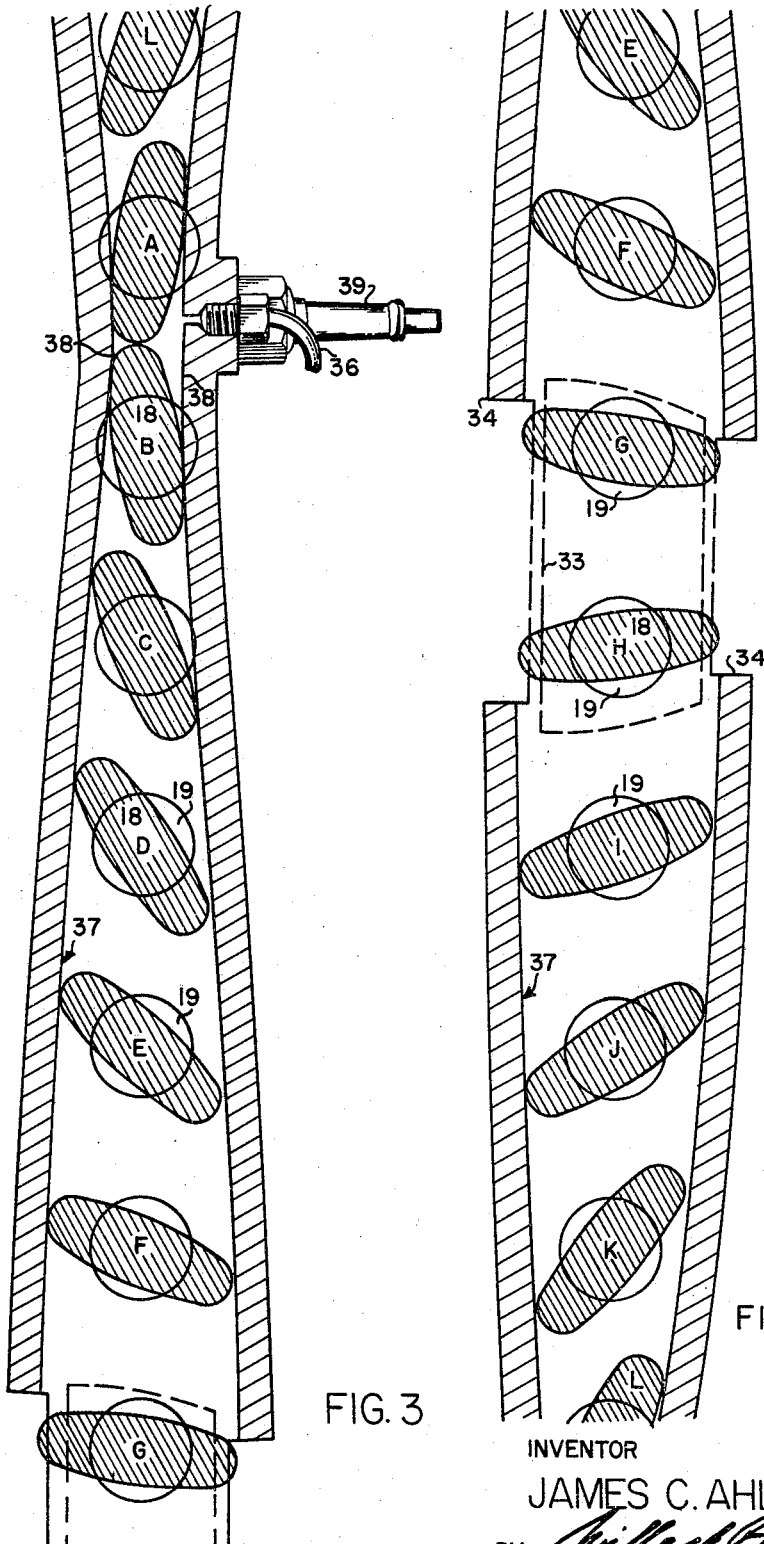
FIG. 3 is a fragmented elongated schematic view depicting a sectional view through the toroidal cylinder and pistons taken in the venturi section of the cylinder at the bottom of the engine as depicted in FIGS. 1 and 2.
FIG. 4 is a fragmented schematic similar in character to FIG. 3 depicting the intake and exhaust segments of the toroidal cylinder.

The fuel and ignition system is partially illustrated in FIGS. 1 and 3. A fuel injection system of the pulsating type similar to the Bosch system or a constant flow system similar to the Hillibrand system might be used. The injection nozzles 36 are preferably positioned in the toroidal cylinder 37 adjacent the base of the blades 18. Referring to FIG. 3, the toroidal cylinder 37 is constructed with a venturi section 38, and the blades 18 are so synchronized in their rotation that their narrowest dimension passes through the throat of the venturi section 38, at which point fuel injection and ignition occurs. The spark plug 39 might be pulse fired using a distributor or magneto like system or a relatively constant spark utilizing a vibrator as in jet engines could be used.

The compression ratio of the system will be approximately ten (10) to one (1) at the point of fuel injection and ignition, however, centrifugal force will increase the compression in the outer perimeters at high r.p.m.'s to possibly sixteen (16) to one (1); accordingly, spontaneous ignition as in a diesel engine would most likely occur. Compression as well as pressures after ignition requires a system of compression seals 40. One is mounted between the shaft 19 of the blade 18 and the spherical housing 13; another compression seal 40 or ring system is placed adjacent the toroidal cylinder 37 between the spherical housing 13 and the engine housing 32. Oil seals 41 are provided around the shaft 10 in the engine housing 32 adjacent the point at which the shaft 10 projects from the said housing.

It is contemplated that the engine will be operable from one thousand (1000) to approximately fifteen thousand (15,000) r.p.m.'s. The cycle of operation can be described generally as two cycle with exhaust and intake occurring at substantially the same instance as previously indicated. The cyclic operation is best illustrated in FIG. 3 with some reference to FIG. 2. Blade 18 at position G is illustrated as having cleared the edge of the exhaust port 33, the gasses are discharged by pressure and centrifugal force. As a blade 18 moves forward to position H, air tends to rush into the evacuated area through the two intake ports 34. As the piston moves forward to positions I and J, a charge of air is contained between the two blades 18 or pistons. The movement through K and L starts compression which reaches maximum pressure between the two blades 18 at the positions A and B. At this point ignition is initiated, as the blades move forward to positions B, C, D, E, ignition and expansion of the gasses continue thereby applying rotary force to the system. The cycle would be substantially identical if less or more blades 18 were utilized.

It is acknowledged that only one preferred embodiment of this invention has been disclosed and described in detail. A six (6) blade embodiment incorporating the basic concepts herein disclosed has been designed, the only substantial variation residing in the gear means utilized to position the blades 18 in the toroidal cylinder 37. It is desired to claim all modifications or embodiments which do not depart from the spirit and scope of the concepts and principles herein disclosed as defined in the appended claims.

I claim:
1. A rotary engine comprising:
 (a) A toroidal cylinder,
 (b) An engine housing encasing said toroidal cylinder,
 (c) A venturi section in said toroidal cylinder,
 (d) An intake port projecting through said engine housing into said toroidal cylinder, positioned in said toroidal cylinder substantially 180° from said venturi section,
 (e) An exhaust port projecting through said engine housing into said toroidal cylinder, positioned adjacent and substantially in an opposite sidewall from said intake port said exhaust port is so positioned in said toroidal cylinder as to be uncovered by a blade prior to the uncovering of said intake port said intake port and said exhaust port positioned in said toroidal cylinder in an overlapping relationship constructed and arranged to create a partial vacuum in the said intake port by the momentum of the gasses in the exhaust port in performing the exhaust function,
 (f) A central shaft rotatably mounted in said engine housing at the center of said toroidal cylinder,
 (g) A series of blades mounted on said central shaft; said blades rotating in said toroidal cylinder,
 (h) Gear means interconnecting said central shaft and said blades thereby rotating said blades 180° as said central shaft rotates 360°,
 (i) A substantially spherical housing secured to said central shaft, and mounted for rotation in said engine housing, said spherical housing retaining said blades on said central shaft and,
 (j) Piston positioning gear means mounted on said spherical housing rotating concentric with said spherical housing.

2. A rotary engine comprising:
 (a) A toroidal cylinder,
 (b) An engine housing encasing said toroidal cylinder,
 (c) A venturi section in said toroidal cylinder,
 (d) An intake port projecting through said engine housing into said toroidal cylinder, positioned in said toroidal cylinder substantially 180° from said venturi section,
 (e) An exhaust port projecting through said engine housing into said toroidal cylinder, positioned adjacent and substantially in an opposite sidewall from said intake port said exhaust port is so positioned in said toroidal cylinder as to be uncovered by a blade prior to the uncovering of said intake port said intake port and said exhaust port positioned in said toroidal cylinder in an overlapping relationship constructed and arranged to create a partial vacuum in the said intake port by the momentum of the gasses in the exhaust port in performing the exhaust function,
 (f) A central shaft rotatably mounted in said engine housing at the center of said toroidal cylinder,
 (g) A series of blades mounted on said central shaft; said blades rotating in said toroidal cylinder,
 (h) Gear means interconnecting said central shaft and said blades thereby rotating said blades 180° as said central shaft rotates 360°,
 (i) Said gear means including:
  (1) a conical spur gear mounted on said blades,
  (2) a master gear meshed with said spur gear,
  (3) a synchronizing gear meshed with said master gear,
  (4) a central shaft gear meshed with said synchronizing gear, and
 (j) A spherical housing mounted for rotation in said engine housing said spherical housing rotating concentric with said gear means.

References Cited

UNITED STATES PATENTS

| | | | |
|---|---|---|---|
| 94,892 | 9/1869 | Keith | 103—141 |
| 1,922,477 | 8/1933 | Flind | 123—8 |
| 497,109 | 5/1893 | Wilson | 230—155 |
| 713,663 | 11/1902 | Mills | 91—144 |
| 1,136,976 | 4/1915 | Reaugh | 230—156 |
| 1,831,263 | 11/1931 | Ross | 123—8 |
| 3,057,544 | 10/1962 | Rohsmann | 230—156 |

FOREIGN PATENTS

| | | |
|---|---|---|
| 320,617 | 3/1929 | Great Britain. |
| 1,106,769 | 4/1961 | Germany. |

WILLIAM E. WAYNER, Primary Examiner

U.S. Cl. X.R.

91—144; 230—156